United States Patent
Hiratani et al.

(10) Patent No.: US 12,146,021 B2
(45) Date of Patent: Nov. 19, 2024

(54) CURABLE RESIN COMPOSITION AND CURED PRODUCT THEREOF

(71) Applicant: CANON KABUSHIKI KAISHA, Tokyo (JP)

(72) Inventors: Takayuki Hiratani, Tokyo (JP); Kyohei Wada, Tokyo (JP); Ryo Ogawa, Kanagawa (JP); Chiaki Nishiura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/498,285

(22) Filed: Oct. 31, 2023

(65) Prior Publication Data
US 2024/0059823 A1    Feb. 22, 2024

Related U.S. Application Data

(63) Continuation of application No. 17/229,026, filed on Apr. 13, 2021, now Pat. No. 11,840,597, which is a
(Continued)

(30) Foreign Application Priority Data

| Oct. 22, 2018 | (JP) | 2018-198700 |
| Jun. 7, 2019 | (JP) | 2019-107372 |
| Oct. 11, 2019 | (JP) | 2019-187963 |

(51) Int. Cl.
| C08G 18/10 | (2006.01) |
| B29C 64/129 | (2017.01) |
| B33Y 40/20 | (2020.01) |
| B33Y 50/02 | (2015.01) |
| B33Y 70/10 | (2020.01) |
| C08F 2/50 | (2006.01) |
(Continued)

(52) U.S. Cl.
CPC ............ *C08G 18/10* (2013.01); *B29C 64/129* (2017.08); *B33Y 40/20* (2020.01); *B33Y 50/02* (2014.12);
(Continued)

(58) Field of Classification Search
None
See application file for complete search history.

(56) References Cited

U.S. PATENT DOCUMENTS

| 8,070,908 B2 | 12/2011 | Tsuno et al. |
| 8,980,971 B2 | 3/2015 | Ueda et al. |
(Continued)

FOREIGN PATENT DOCUMENTS

| EP | 1 013 735 A1 | 6/2000 |
| JP | 2004-51665 A | 2/2004 |
(Continued)

OTHER PUBLICATIONS

Notice of Reasons for Refusal in Japanese Application No. 2021-076755 (Jan. 2024).
(Continued)

*Primary Examiner* — Sanza L. McClendon
(74) *Attorney, Agent, or Firm* — Venable LLP

(57) ABSTRACT

A curable resin composition for producing a three-dimensional object formed of a cured resin product comprises a polyfunctional urethane (meth)acrylate having a weight-average molecular weight of 1,000 or more and 60,000 or less; a monofunctional radically polymerizable compound having one radically polymerizable functional group in a molecule; a polyfunctional radically polymerizable compound other than the polyfunctional urethane (meth)acrylate; rubber particles; and a radical polymerization initiator. The monofunctional radically polymerizable compound includes a monofunctional acrylamide-based compound, and the content of the polyfunctional radically polymerizable compound other than polyfunctional urethane (meth) acrylate (particularly one having a radically polymerizable functional group equivalent of less than 300 g/eq) is controlled.

17 Claims, 3 Drawing Sheets

Related U.S. Application Data continuation of application No. PCT/JP2019/040699, filed on Oct. 16, 2019.

(51) Int. Cl.
| | |
|---|---|
| *C08F 220/58* | (2006.01) |
| *C08G 18/67* | (2006.01) |
| *C08K 9/10* | (2006.01) |
| *B29K 75/00* | (2006.01) |
| *B33Y 10/00* | (2015.01) |
| *C08L 9/10* | (2006.01) |
| *C08L 33/12* | (2006.01) |

(52) U.S. Cl.
CPC ............... *B33Y 70/10* (2020.01); *C08F 2/50* (2013.01); *C08F 220/58* (2013.01); *C08G 18/672* (2013.01); *C08K 9/10* (2013.01); *B29K 2075/00* (2013.01); *B29K 2995/0017* (2013.01); *B29K 2995/007* (2013.01); *B33Y 10/00* (2014.12); *C08K 2201/003* (2013.01); *C08L 9/10* (2013.01); *C08L 33/12* (2013.01); *C08L 2207/53* (2013.01)

(56) References Cited

U.S. PATENT DOCUMENTS

| 11,739,175 B2 | 8/2023 | Matsuoka |
| 2006/0155045 A1 | 7/2006 | Tsuno et al. |
| 2010/0227941 A1 | 9/2010 | Ueda et al. |
| 2019/0315981 A1 | 10/2019 | Nishiura |
| 2022/0073669 A1 | 3/2022 | Hiratani et al. |

FOREIGN PATENT DOCUMENTS

| JP | 2006-2110 A | | 1/2006 |
| JP | 2006-009020 A | | 1/2006 |
| JP | 2006002110 A | * | 1/2006 |
| JP | 2009-62510 A | | 3/2009 |
| JP | 2013-23574 A | | 2/2013 |
| JP | 2014-201688 A | | 10/2014 |
| JP | 2019-156932 A | | 9/2019 |
| WO | 2018/020732 A1 | | 2/2018 |
| WO | 2020/085166 A1 | | 4/2020 |

OTHER PUBLICATIONS

International Search Report in International Application No. PCT/JP2019/040699 (Dec. 2019).
Decision of Rejection in Japanese Application No. 2019-187963 (Feb. 2021).
International Preliminary Report on Patentability in International Application No. PCT/JP2019/040699 (May 2021).
Extended European Search Report in European Application No. 19877495.2 (Jun. 2022).
First Office Action in Chinese Application No. 201980069398.5 (Jan. 2023).

* cited by examiner

CURABLE RESIN COMPOSITION AND CURED PRODUCT THEREOF

CROSS-REFERENCE TO RELATED APPLICATIONS

This application is a continuation application of U.S. patent application Ser. No. 17/229,026, filed Apr. 13, 2021, which is a continuation application of International Patent Application No. PCT/JP2019/040699, filed Oct. 16, 2019, which claims the benefit of Japanese Patent Application No. 2018-198700, filed Oct. 22, 2018, Japanese Patent Application No. 2019-107372, filed Jun. 7, 2019, and Japanese Patent Application No. 2019-187963, filed Oct. 11, 2019. All of these prior applications are hereby incorporated by reference herein in their entirety.

BACKGROUND OF THE INVENTION

Field of the Invention

The present invention relates to a curable resin composition and a cured product thereof.

Description of the Related Art

There is known an optical three-dimensional shaping method (hereinafter referred to as optical shaping method) involving repeating a process of selectively irradiating a photocurable resin composition with light based on a three-dimensional shape of a three-dimensional model to form a cured resin layer, to thereby produce a shaped object in which the cured resin layers are integrally stacked.

Specifically, a liquid surface of a photocurable resin composition in a liquid state accommodated in a container is irradiated with light from an ultraviolet laser or the like according to slice data generated from three-dimensional shape data on a three-dimensional model to be produced, to thereby form a cured resin layer having a desired pattern with a predetermined thickness. Then, the photocurable resin composition in an amount corresponding to one layer is supplied onto the cured resin layer, and is similarly irradiated with light, to thereby stack and form a new cured resin layer continuous to the previously formed cured resin layer. In this way, cured resin layers are stacked one after another in a pattern based on the slice data. Thus, a desired three-dimensional shaped object can be obtained. According to such optical shaping method, even a three-dimensional object of a complicated shape can be easily produced as long as three-dimensional shape data on the three-dimensional model is available.

Progress has been made in application of the optical shaping method to shaping of a prototype for shape checking (rapid prototyping), and to shaping of a working model for testing functionality or shaping of a mold (rapid tooling). Further, in recent years, uses of the optical shaping method have started to expand into shaping of an actual product (rapid manufacturing).

Under such background, there is a demand for a photocurable resin composition that allows shaping of a three-dimensional shaped object having such high impact resistance as to be comparable to that of a general-purpose engineering plastic, and such high heat resistance as to prevent deformation even at a relatively high temperature.

In Japanese Patent Application Laid-Open No. 2004-51665, there is a disclosure of a resin composition for optical three-dimensional shaping containing a urethane (meth)acrylate having a specific structure, an ethylenically unsaturated compound having a radically polymerizable group, elastomer particles, and a radical polymerization initiator. In addition, in Japanese Patent Application Laid-Open No. 2013-23574, there is a disclosure of a curable resin composition containing an oxetane compound, a compound having two or more epoxy groups, a photocationic polymerization initiator, a radical polymerization initiator, and a photoradical polymerization initiator.

However, a cured product of the resin composition for optical three-dimensional shaping of Japanese Patent Application Laid-Open No. 2004-51665, which achieves satisfactory mechanical strength, is not sufficient from the viewpoints of heat resistance and impact resistance. In addition, a cured product of the curable resin composition of Japanese Patent Application Laid-Open No. 2013-23574 achieves high heat resistance and satisfactory toughness (snap-fit property), but does not have sufficient impact resistance, thereby being insufficient in terms of achieving both of high impact resistance and high heat resistance.

SUMMARY OF THE INVENTION

An object of the present disclosure is to provide a curable resin composition capable of providing a cured product excellent in heat resistance and impact resistance. A curable resin composition according to the present disclosure contains a polyfunctional urethane (meth)acrylate having a weight-average molecular weight of 1,000 or more and 60,000 or less, a monofunctional radically polymerizable compound having one radically polymerizable functional group in the molecule, rubber particles, and a radical polymerization initiator.

Further features of the present invention will become apparent from the following description of exemplary embodiments with reference to the attached drawings.

DESCRIPTION OF THE EMBODIMENTS

Figure 1:
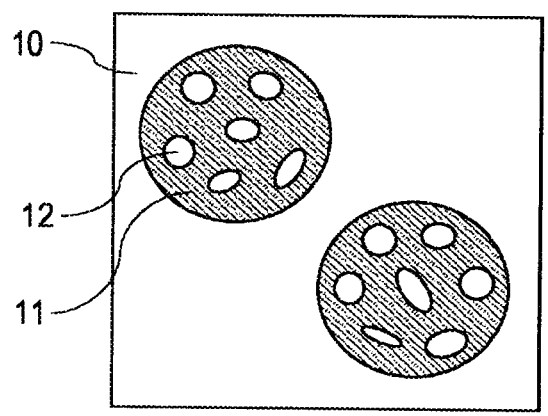
FIG. 1 is a schematic cross-sectional view of a cured product obtained by curing a curable resin composition according to an embodiment of the present invention.

Embodiments of the present invention (hereinafter also referred to as "this embodiment") are described below. The embodiments described below are merely some of the embodiments of the present invention, and the present invention is not limited to these embodiments.

<Polyfunctional Urethane (Meth)Acrylate>

A polyfunctional urethane (meth)acrylate contained in a curable composition according to this embodiment is a urethane (meth)acrylate having at least two (meth)acryloyl groups and at least two urethane groups in the molecule.

Examples of the urethane (meth)acrylate include: a product obtained by allowing a hydroxy group-containing (meth)acrylate-based compound and a polyisocyanate-based compound to react with each other; and a product obtained by allowing an isocyanate group-containing (meth)acrylate-based compound and a polyol-based compound to react with each other. Another example thereof is a product obtained by allowing a hydroxy group-containing (meth)acrylate-based compound, a polyisocyanate-based compound, and a polyol-based compound to react with each other. Of those, in particular, a product obtained by allowing a hydroxy group-containing (meth)acrylate-based compound, a polyisocyanate-based compound, and a polyol-based compound to react with each other is preferred from the viewpoint of imparting high impact resistance.

Examples of the hydroxy group-containing (meth)acrylate-based compound include: hydroxyalkyl (meth)acrylates, such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate; and 2-hydroxyethylacryloyl phosphate, 2-(meth)acryloyloxyethyl-2-hydroxypropyl phthalate, caprolactone-modified 2-hydroxyethyl (meth)acrylate, dipropylene glycol (meth)acrylate, a fatty acid-modified glycidyl (meth)acrylate, polyethylene glycol mono(meth)acrylate, polypropylene glycol mono(meth)acrylate, 2-hydroxy-3-(meth)acryloyloxypropyl (meth)acrylate, glycerin di(meth)acrylate, 2-hydroxy-3-acryloyl-oxypropyl methacrylate, pentaerythritol tri(meth)acrylate, caprolactone-modified pentaerythritol tri(meth)acrylate, ethylene oxide-modified pentaerythritol tri(meth)acrylate, dipentaerythritol penta(meth)acrylate, caprolactone-modified dipentaerythritol penta(meth)acrylate, and ethylene oxide-modified dipentaerythritol penta(meth)acrylate. Those hydroxy group-containing (meth)acrylate-based compounds may be used alone or in combination thereof.

As the polyvalent isocyanate-based compound, there may be used, for example: an aromatic polyisocyanate, such as tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, or naphthalene diisocyanate; an aliphatic polyisocyanate, such as pentamethylene diisocyanate, hexamethylene diisocyanate, trimethylhexamethylene diisocyanate, lysine diisocyanate, or lysine triisocyanate; an alicyclic polyisocyanate, such as hydrogenated diphenylmethane diisocyanate, hydrogenated xylylene diisocyanate, isophorone diisocyanate, norbornene diisocyanate, or 1,3-bis(isocyanatomethyl)cyclohexane; or a trimer compound or a multimer compound of any of those polyisocyanates, an allophanate-type polyisocyanate, a biuret-type polyisocyanate, or a water dispersion-type polyisocyanate. Those polyvalent isocyanate-based compounds may be used alone or in combination thereof.

Examples of the polyol-based compound include a polyether-based polyol, a polyester-based polyol, a polycarbonate-based polyol, a polyolefin-based polyol, a polybutadiene-based polyol, a (meth)acrylic polyol, and a polysiloxane-based polyol. Those polyol-based compounds may be used alone or in combination thereof.

Examples of the polyether-based polyol include alkylene structure-containing polyether-based polyols, such as polyethylene glycol, polypropylene glycol, polytetramethylene glycol, polybutylene glycol, and polyhexamethylene glycol, and random or block copolymers of those polyalkylene glycols.

Examples of the polyester-based polyol include a polycondensate of a polyhydric alcohol and a polyvalent carboxylic acid, a ring-opening polymerization product of a cyclic ester (lactone), and a reaction product of three kinds of components, that is, a polyhydric alcohol, a polyvalent carboxylic acid, and a cyclic ester.

Examples of the polyhydric alcohol include ethylene glycol, diethylene glycol, propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerin, trimethylolpropane, trimethylolethane, cyclohexanediols (e.g., 1,4-cyclohexanediol), bisphenols (e.g., bisphenol A), and sugar alcohols (e.g., xylitol and sorbitol).

Examples of the polyvalent carboxylic acid include: aliphatic dicarboxylic acids, such as malonic acid, maleic acid, fumaric acid, succinic acid, glutaric acid, adipic acid, suberic acid, azelaic acid, sebacic acid, and dodecanedioic acid; alicyclic dicarboxylic acids, such as 1,4-cyclohexanedicarboxylic acid; and aromatic dicarboxylic acids, such as terephthalic acid, isophthalic acid, o-phthalic acid, 2,6-naphthalenedicarboxylic acid, p-phenylenedicarboxylic acid, and trimellitic acid.

Examples of the cyclic ester include propiolactone, β-methyl-δ-valerolactone, and ε-caprolactone.

Examples of the polycarbonate-based polyol include a reaction product of a polyhydric alcohol and phosgene, and a ring-opening polymerization product of a cyclic carbonic acid ester (e.g., an alkylene carbonate).

Examples of the polyhydric alcohol include the polyhydric alcohols given as examples in the description of the polyester-based polyol, and examples of the alkylene carbonate include ethylene carbonate, trimethylene carbonate, tetramethylene carbonate, and hexamethylene carbonate.

The polycarbonate polyol only needs to be a compound having intramolecular carbonate bonds and terminal hydroxyl groups, and may have ester bonds together with the carbonate bonds.

The weight-average molecular weight of the urethane (meth)acrylate is 1,000 or more and 60,000 or less, preferably 1,500 or more and 50,000 or less, more preferably 2,000 or more and 50,000 or less. A case in which the weight-average molecular weight is 1,000 or more is preferred because the impact resistance of a cured product tends to be markedly increased along with a reduction in crosslink density. In addition, when the weight-average molecular weight is 1,000 or more, in a polymerization process under the condition of coexisting with a monofunctional radically polymerizable compound, there is a tendency that a structure in which polymers using the two compounds as respective main components are microscopically phase-separated is easily formed. A similar tendency is observed in a polymerization process under the condition of coexisting with the monofunctional radically polymerizable compound and a polyfunctional radically polymerizable compound. That is, it becomes easy to form a phase-separated structure in which a phase formed of a polymer using the polyfunctional urethane (meth)acrylate as a main component, and a phase using the monofunctional radically polymerizable compound as a main component or a phase formed of a polymer using the monofunctional radically polymerizable compound and the polyfunctional radically polymerizable compound as main components are microscopically separated, and this tends to contribute to improving the impact resistance. Examples of the phase-separated structure include a so-called sea-island structure and a co-continuous structure. A case in which the weight-average molecular weight is more than 60,000 is not preferred because the viscosity of the curable composition tends to be markedly increased, making its handling difficult.

The weight-average molecular weight (Mw) of the urethane (meth)acrylate is a weight-average molecular weight in terms of the molecular weight of standard polystyrene, and is measured using a high-performance liquid chromatograph (manufactured by Tosoh Corporation, high-performance GPC apparatus "HLC-8220GPC") with two Shodex GPCLF-804 columns (exclusion limit molecular weight: $2 \times 10^6$, separation range: 300 to $2 \times 10^6$) in series.

The content of the polyfunctional urethane (meth)acrylate in the curable resin composition according to this embodiment is preferably 5 parts by mass or more and 70 parts by mass or less with respect to 100 parts by mass of the total amount of the polyfunctional urethane (meth)acrylate, the monofunctional radically polymerizable compound, and the polyfunctional radically polymerizable compound. The content is more preferably 10 parts by mass or more and 60 parts by mass or less. When the content of the polyfunctional urethane (meth)acrylate falls within the above-mentioned ranges, high impact resistance and high heat resistance can both be achieved. A case in which the content of the polyfunctional urethane (meth)acrylate is less than 5 parts by mass is not preferred because the impact resistance tends to be remarkably reduced. In addition, a case in which the content of the polyfunctional urethane (meth)acrylate is more than 70 parts by mass is not preferred because the heat resistance tends to be markedly reduced, and besides, the viscosity of the resin composition tends to be remarkably increased.

<Monofunctional Radically Polymerizable Compound>

The monofunctional radically polymerizable compound contained in the curable resin composition according to this embodiment is a radically polymerizable compound having one radically polymerizable functional group in the molecule. An example of the radically polymerizable functional group is an ethylenically unsaturated group. Specific examples of the ethylenically unsaturated group include a (meth)acryloyl group and a vinyl group. Herein, the (meth) acryloyl group refers to an acryloyl group or a methacryloyl group.

Examples of the monofunctional radically polymerizable compound having a (meth)acryloyl group include a monofunctional acrylamide-based compound and a monofunctional (meth)acrylate-based compound.

Examples of the monofunctional acrylamide-based compound include (meth)acrylamide, N-methyl(meth)acrylamide, N-isopropyl(meth)acrylamide, N-tert-butyl(meth)acrylamide, N-phenyl(meth)acrylamide, N-methylol (meth) acrylamide, N,N-diacetone(meth)acrylamide, N,N-dimethyl (meth)acrylamide, N,N-diethyl(meth)acrylamide, N,N-dipropyl(meth)acrylamide, N,N-dibutyl(meth)acrylamide, N-(meth)acryloylmorpholine, N-(meth)acryloylpiperidine, and N-[3-(dimethylamino)propyl]acrylamide.

In addition, examples of the monofunctional (meth)acrylate-based compound include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth) acrylate, stearyl (meth)acrylate, cyclohexyl (meth)acrylate, isobornyl (meth)acrylate, adamantyl (meth)acrylate, 3-hydroxy-1-adamantyl (meth)acrylate, 3,5-dihydroxy-1-adamantyl (meth)acrylate, 2-methyl-2-adamantyl (meth)acrylate, 2-ethyl-2-adamantyl (meth)acrylate, 2-isopropyl-2-adamantyl (meth)acrylate, 2-hydroxyethyl (meth)acrylate, 2-hydroxypropyl (meth)acrylate, 2-hydroxybutyl (meth) acrylate, 4-hydroxybutyl (meth)acrylate, glycidyl (meth) acrylate, 3-methyl-3-oxetanyl-methyl (meth)acrylate, tetrahydrofurfuryl (meth)acrylate, phenylglycidyl (meth) acrylate, dimethylaminomethyl (meth)acrylate, phenyl cellosolve (meth)acrylate, dicyclopentenyl (meth)acrylate, dicyclopentenyloxyethyl (meth)acrylate, biphenyl (meth) acrylate, 2-hydroxyethyl (meth)acryloyl phosphate, phenyl (meth)acrylate, phenoxyethyl (meth)acrylate, phenoxypropyl (meth)acrylate, benzyl (meth)acrylate, butoxytriethylene glycol (meth)acrylate, 2-ethylhexyl polyethylene glycol (meth)acrylate, nonylphenyl polypropylene glycol (meth) acrylate, methoxy dipropylene glycol (meth)acrylate, glycerol (meth)acrylate, trifluoromethyl (meth)acrylate, trifluoroethyl (meth)acrylate, tetrafluoropropyl (meth)acrylate, octafluoropentyl acrylate, polyethylene glycol (meth)acrylate, polypropylene glycol (meth)acrylate, allyl (meth)acrylate, 2,2,2-trifluoroethyl (meth)acrylate, 2,2,3,3-tetrafluoropropyl (meth)acrylate, 1H, 1H,5H, octafluoropentyl (meth) acrylate epichlorohydrin-modified butyl (meth)acrylate, epichlorohydrin-modified phenoxy(meth)acrylate, ethylene oxide (EO)-modified phthalic acid (meth)acrylate, EO-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholino (meth)acrylate, EO-modified phosphoric acid (meth)acrylate, allyloxymethyl acrylate (product name: AO-MA, manufactured by Nippon Shokubai Co., Ltd.), (meth)acrylates each having an imide group (product name: M-140, manufactured by Toagosei Co., Ltd.), and monofunctional (meth)acrylates each having a siloxane structure.

Examples of the monofunctional radically polymerizable compound having an ethylenically unsaturated group other than the (meth)acryloyl group include: styrene; styrene derivatives, such as vinyltoluene, α-methylstyrene, chlorostyrene, and styrenesulfonic acid and salts thereof; maleimides, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; vinyl esters, such as vinyl acetate, vinyl propionate, vinyl pivalate, vinyl benzoate, and vinyl cinnamate; vinyl cyanide compounds, such as (meth)acrylonitrile; and N-vinyl compounds, such as N-vinylpyrrolidone, N-vinylcaprolactam, N-vinylimidazole, N-vinylmorpholine, and N-vinylacetamide.

Those monofunctional radically polymerizable compounds may be used alone or in combination thereof.

From the viewpoint of increasing a curing rate, the monofunctional radically polymerizable compound to be used for the curable resin composition according to this embodiment preferably contains a monofunctional acrylamide-based compound or a monofunctional (meth)acrylate-based compound. The monofunctional radically polymerizable compound particularly preferably contains a monofunctional acrylamide-based compound.

Further, when the monofunctional radically polymerizable compound contains the monofunctional acrylamide-based compound or the monofunctional (meth)acrylate-based compound, a shaped object having particularly excellent impact resistance can be achieved. This is presumably because a mixed resin composition formed of the polyfunctional urethane (meth)acrylate and the monofunctional radically polymerizable compound, or a mixed resin composition formed of the polyfunctional urethane (meth) acrylate, the monofunctional radically polymerizable compound, and the polyfunctional radically polymerizable compound penetrates the inside of each of the rubber particles to moderately swell the rubber particles. That is, a contact area between each of the rubber particles and a cured product of the mixed resin composition is markedly increased to improve interfacial adhesiveness, to thereby express excellent impact resistance. A cured product formed from such curable resin composition expresses a so-called salami structure, which is a structure in which a polymer formed from the polyfunctional urethane (meth)acrylate and the monofunctional radically polymerizable compound, or a polymer formed from the polyfunctional urethane (meth)acrylate, the monofunctional radically polymerizable compound, and the polyfunctional radically polymerizable compound is scattered at a plurality of sites in each of the rubber particles. Presumably as a result of the foregoing, the impact resistance of the cured product is dramatically improved.

The content of the monofunctional acrylamide-based compound or the monofunctional (meth)acrylate-based compound with respect to 100 parts by mass of the monofunctional radically polymerizable compound is preferably 5 parts by mass or more and 100 parts by mass or less with respect to 100 parts by mass of the monofunctional radically polymerizable compound. The content is more preferably 10 parts by mass or more and 100 parts by mass or less, still more preferably 15 parts by mass or more and 100 parts by mass or less. When the content falls within the above-mentioned ranges, a sufficient curing rate can be achieved in the curable resin composition according to this embodiment, and besides, high impact resistance and high heat resistance can both be achieved in a cured product according to this embodiment.

<Polyfunctional Radically Polymerizable Compound>

The polyfunctional radically polymerizable compound that may be contained in the curable composition according to this embodiment has two or more radically polymerizable functional groups in the molecule. Herein, the polyfunctional radically polymerizable compound excludes the polyfunctional urethane (meth)acrylate. In addition, the polyfunctional radically polymerizable compound includes a polyfunctional radically polymerizable compound having a radically polymerizable functional group equivalent of less than 300 g/eq and a polyfunctional radically polymerizable compound having a radically polymerizable functional group equivalent of 300 g/eq or more. In this embodiment, the "radically polymerizable functional group equivalent" is a value indicating a molecular weight per radically polymerizable functional group. Hereinafter, when the radically polymerizable compound having a radically polymerizable functional group equivalent of less than 300 g/eq and the radically polymerizable compound having a radically polymerizable functional group equivalent of 300 g/eq or more do not need to be distinguished from each other, these compounds are referred to simply as polyfunctional radically polymerizable compound.

When the curable composition contains the polyfunctional radically polymerizable compound, the content of the polyfunctional radically polymerizable compound needs to be limited in order to obtain a cured product more excellent in both of impact resistance and heat resistance than the related art. Specifically, in order to obtain a cured product excellent in both of impact resistance and heat resistance, it is required that the content of the polyfunctional radically polymerizable compound having a radically polymerizable functional group equivalent of less than 300 g/eq be set to more than 0 parts by mass and less than 20 parts by mass with respect to 100 parts by mass of the total amount of the monofunctional radically polymerizable compound and the polyfunctional radically polymerizable compound. In this embodiment, the "radically polymerizable functional group equivalent" is a value indicating a molecular weight per radically polymerizable functional group. The incorporation of the polyfunctional radically polymerizable compound having a radically polymerizable functional group equivalent of less than 300 g/eq tends to reduce the impact resistance of a cured product, but a curable composition in which the content thereof is less than 20 parts by mass allows its cured product to achieve high impact resistance that has not been obtained in the related art. However, when the content of the polyfunctional radically polymerizable compound is 20 parts by mass or more, there is a tendency that the crosslink density of the cured product is increased, and at the same time, the crosslink density is remarkably nonuniformized. This causes stress concentration at the time of application of an external impact, with the result that the impact resistance-improving effect of the addition of the rubber particles is not obtained. Consequently, Charpy impact strength is sharply reduced and reduced to a value equivalent to that of the related art.

In addition, the content of the radically polymerizable compound having a radically polymerizable functional group equivalent of 300 g/eq or more is preferably more than 0 parts by mass and less than 50 parts by mass with respect to 100 parts by mass of the total amount of the monofunctional radically polymerizable compound and the polyfunctional radically polymerizable compound.

An example of the radically polymerizable functional group is an ethylenically unsaturated group. Examples of the ethylenically unsaturated group include a (meth)acryloyl group and a vinyl group. Examples of the polyfunctional radically polymerizable compound include a polyfunctional (meth)acrylate-based compound, a vinyl ether group-containing (meth)acrylate-based compound, a polyfunctional (meth)acryloyl group-containing isocyanurate-based compound, a polyfunctional (meth)acrylamide-based compound, a polyfunctional urethane (meth)acrylate-based compound, a polyfunctional maleimide-based compound, a polyfunctional vinyl ether-based compound, and a polyfunctional aromatic vinyl-based compound.

Examples of the polyfunctional (meth)acrylate-based compound may include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, 1,3-butylene glycol di(meth)acrylate, 1,4-butanediol di(meth)acrylate, dimethyloltricyclodecane di(meth)acrylate, trimethylolpropane tri(meth)acrylate, neopentyl glycol di(meth)acrylate, 1,6-hexamethylene di(meth)acrylate, hydroxypivalic acid ester neopentyl glycol di(meth)acrylate, pentaerythritol tri(meth)acrylate, pentaerythritol tetra(meth)acrylate, ditrimethylolpropane tetraacrylate, dipentaerythritol tetra(meth)acrylate, dipentaerythritol penta(meth)acrylate, dipentaerythritol hexa(meth)acrylate, a di(meth)acrylate of an ε-caprolactone adduct of neopentyl glycol hydroxypivalate (e.g., KAYARAD HX-220 and HX-620 manufactured by Nippon Kayaku Co., Ltd.), a di(meth)acrylate of an EO adduct of bisphenol A, a polyfunctional (meth)acrylate having a fluorine atom, a polyfunctional (meth)acrylate having a siloxane structure, polycarbonate diol di(meth)acrylate, polyester di(meth)acrylate, and a polyethylene glycol di(meth)acrylate.

Examples of the vinyl ether group-containing (meth)acrylate-based compound include 2-vinyloxyethyl (meth)acrylate, 4-vinyloxybutyl (meth)acrylate, 4-vinyloxycyclohexyl (meth)acrylate, 2-(vinyloxyethoxy)ethyl (meth) acrylate, and 2-(vinyloxyethoxyethoxyethoxy)ethyl (meth) acrylate.

Examples of the polyfunctional (meth)acryloyl group-containing isocyanurate-based compound include tri(acryloyloxyethyl)isocyanurate, tri(methacryloyloxyethyl) isocyanurate, and ε-caprolactone-modified tris-(2-acryloxyethyl) isocyanurate.

Examples of the polyfunctional (meth)acrylamide-based compound include N,N'-methylenebisacrylamide, N,N'-ethylenebisacrylamide, N,N'-(1,2-dihydroxyethylene)bisacrylamide, N,N'-methylenebismethacrylamide, and N,N',N"-triacryloyldiethylenetriamine.

Examples of the polyfunctional maleimide-based compound include 4,4'-diphenylmethanebismaleimide, m-phenylenebismaleimide, bisphenol A diphenyl ether bismaleimide, 3,3'-dimethyl-5,5'-diethyl-4,4'-diphenylmethanebismaleimide, 4-methyl-1,3-phenylenebismaleimide, and 1,6-bismaleimide-(2,2,4-trimethyl)hexane.

Examples of the polyfunctional vinyl ether-based compound include ethylene glycol divinyl ether, diethylene glycol divinyl ether, polyethylene glycol divinyl ether, propylene glycol divinyl ether, butylene glycol divinyl ether, hexanediol divinyl ether, a bisphenol A alkylene oxide divinyl ether, a bisphenol F alkylene oxide divinyl ether, trimethylolpropane trivinyl ether, ditrimethylolpropane tetravinyl ether, glycerin trivinyl ether, pentaerythritol tetravinyl ether, dipentaerythritol pentavinyl ether, and dipentaerythritol hexavinyl ether.

An example of the polyfunctional aromatic vinyl-based compound is divinylbenzene.

Those polyfunctional radically polymerizable compounds may be used alone or in combination thereof.

<Rubber Particles>

The curable resin composition according to this embodiment contains rubber particles, and as a result, the impact resistance of its cured product can be markedly improved.

In this embodiment, the kind of the rubber particles is not particularly limited. Preferred examples of a composition for forming the rubber particles include a butadiene rubber, a styrene/butadiene copolymer rubber, an acrylonitrile/butadiene copolymer rubber, a saturated rubber obtained by hydrogenating or partially hydrogenating any of those diene rubbers, a crosslinked butadiene rubber, an isoprene rubber, a chloroprene rubber, a natural rubber, a silicon rubber, an ethylene/propylene/diene monomer ternary copolymer rubber, an acrylic rubber, and an acrylic/silicone composite rubber. The rubber particles are each preferably formed of one, or a combination of two or more kinds, of those compositions. Of those, rubber particles each formed of any one of a butadiene rubber, a crosslinked butadiene rubber, a styrene/butadiene copolymer rubber, an acrylic rubber, and a silicone/acrylic composite rubber are particularly preferred from the viewpoint of flexibility.

The glass transition temperature of the composition of each of the rubber particles is preferably 25° C. or less. The glass transition temperature is more preferably 20° C. or less. When the glass transition temperature is higher than 25° C., there is a tendency that the impact resistance-improving effect is hardly obtained. The glass transition temperature of the composition of each of the rubber particles may be determined by, for example, differential scanning calorimetry (DSC) or dynamic viscoelasticity measurement (DMA).

The rubber particles are more preferably rubber particles each having a core-shell structure. Specifically, it is preferred that the rubber particles each have the above-mentioned composition for the rubber particles as a core portion, the outside thereof being covered with a shell formed of a polymer of a radically polymerizable compound. The use of the rubber particles each having such core-shell structure can improve the dispersibility of the rubber particles in a mixed resin composition of the polyfunctional urethane (meth)acrylate and the monofunctional radically polymerizable compound, or in a mixed resin composition of the polyfunctional urethane (meth)acrylate, the monofunctional radically polymerizable compound, and the polyfunctional radically polymerizable compound. As a result, a cured product in which the rubber particles are dispersed is obtained, and the rubber particles can effectively function in the cured product to remarkably improve its impact resistance.

The polymer of the radically polymerizable compound for forming the shell preferably has the form of being graft-polymerized onto the surface of the core via a chemical bond and partially or entirely covering the core. Rubber particles each having a core-shell structure in which the shell is graft-polymerized onto the core may be formed by subjecting the radically polymerizable compound to graft polymerization by a known method in the presence of particles each of which is to serve as the core. For example, such rubber particles may be produced by adding and polymerizing the radically polymerizable compound, which serves as a component for forming the shell, onto latex particles dispersed in water, which may be prepared through emulsion polymerization, miniemulsion polymerization, suspension polymerization, or the like.

When the surface of the core does not have, or has an extremely small amount of, a reactive site, such as an ethylenically unsaturated group, onto which the shell can be graft-polymerized, the shell may be graft-polymerized after an intermediate layer containing a reactive site has been arranged on the surface of each of the particles each of which is to serve as the core. That is, the form of the rubber particles each having a core-shell structure also encompasses a form in which the shell is arranged on the core via the intermediate layer.

Preferred examples of the composition for forming the core of the rubber particles each having a core-shell structure include a butadiene rubber, a styrene/butadiene copolymer rubber, an acrylonitrile/butadiene copolymer rubber, a saturated rubber obtained by hydrogenating or partially hydrogenating any of those diene rubbers, a crosslinked butadiene rubber, an isoprene rubber, a chloroprene rubber, a natural rubber, a silicon rubber, an ethylene/propylene/diene monomer ternary copolymer rubber, an acrylic rubber, and an acrylic/silicone composite rubber. The core is preferably formed of one, or a combination of two or more kinds, of those compositions. Of those, a core formed of at least any one of a butadiene rubber, a crosslinked butadiene rubber, a styrene/butadiene copolymer rubber, an acrylic rubber, and a silicone/acrylic composite rubber is particularly preferred from the viewpoint of flexibility.

A monofunctional radically polymerizable compound having one radically polymerizable functional group in the molecule may be suitably used as the radically polymerizable compound for forming the shell of each of the rubber particles each having a core-shell structure. Rubber particles each having a shell containing a polymer of the monofunctional radically polymerizable compound are preferred because of being excellent in dispersibility in a mixed resin composition formed of the polyfunctional urethane (meth) acrylate and the monofunctional radically polymerizable compound, or in a mixed resin composition of the polyfunctional urethane (meth)acrylate, the monofunctional radically polymerizable compound, and the polyfunctional radically polymerizable compound. The monofunctional radically polymerizable compound to be used for forming the shell may be appropriately selected from the viewpoints of compatibility with the core and dispersibility in the mixed resin composition, and materials among those given as examples of the monofunctional radically polymerizable compound serving as a material for the curable resin composition may be used alone or in combination thereof. Of those, rubber particles each having a shell containing a polymer of a monofunctional radically polymerizable compound having a (meth)acryloyl group are particularly preferably used because the rubber particles can be satisfactorily dispersed in the curable resin composition, and because an increase in viscosity of the curable resin composition can be suppressed. It is more preferred to use rubber particles each containing a polymer of a hydrophobic monofunctional radically polymerizable compound having a (meth)acryloyl group.

In addition, the monofunctional radically polymerizable compound may be used in combination with a polyfunctional radically polymerizable compound or a polyfunctional urethane (meth)acrylate as the radically polymerizable compound for forming the shell. When the polyfunctional radically polymerizable compound is used to form the shell, the viscosity of the curable resin composition tends to be reduced, making its handling easy. Meanwhile, when the content of the polyfunctional radically polymerizable compound is excessively high, there is a tendency that the impact resistance-improving effect of the addition of the rubber particles each having a core-shell structure is hardly obtained. For this reason, the content of the polyfunctional radically polymerizable compound to be used for forming the shell is preferably 0 parts by mass or more and 40 parts by mass or less with respect to 100 parts by mass of the radically polymerizable compound to be used for forming the shell. Further, the content is more preferably 0 parts by mass or more and 30 parts by mass or less, particularly preferably 0 parts by mass or more and 25 parts by mass or less. The urethane (meth)acrylate and the polyfunctional radically polymerizable compound that are to be used for forming the shell may be appropriately selected from the viewpoints of compatibility with the core and dispersibility in the mixed resin composition, and materials among those given as examples of the urethane (meth)acrylate and the polyfunctional radically polymerizable compound serving as materials for the curable resin composition may be used alone or in combination thereof.

A mass ratio between the core and the shell in each of the rubber particles each having a core-shell structure is preferably 1 part by mass or more and 200 parts by mass or less, more preferably 2 parts by mass or more and 180 parts by mass or less of the shell with respect to 100 parts by mass of the core. When the mass ratio between the core and the shell falls within the above-mentioned ranges, the impact resistance-improving effect of the incorporation of the rubber particles tends to be great. When the shell accounts for less than 1 part by mass, there is a tendency that dispersibility in the curable resin composition is not sufficient, with the result that the impact resistance-improving effect is hardly obtained. In addition, when the shell accounts for more than 200 parts by mass, a large amount of the rubber particles needs to be added in order to obtain the impact resistance-improving effect, and hence there is a tendency that the viscosity of the curable resin composition is remarkably increased, making its handling difficult.

The average particle diameter of the rubber particles is preferably 20 nm or more and 10 µm or less, more preferably 50 nm or more and 5 µm or less. When the average particle diameter is less than 20 nm, there is a tendency that an increase in viscosity in the curable resin composition along with the addition of the rubber particles, or an interaction between the rubber particles occurring along with an increase in specific surface area of the rubber particles causes a reduction in heat resistance of the cured product or a reduction in impact resistance thereof. In addition, when the average particle diameter is more than 5 there is a tendency that dispersibility of the rubber particles (rubber component) in the curable resin composition is not sufficiently obtained, with the result that the impact resistance-improving effect of the addition of the rubber particles is reduced.

The average particle diameter of the rubber particles may be measured using a dynamic light scattering method. For example, the rubber particles may be dispersed in an appropriate organic solvent, followed by measurement with a particle size analyzer.

In addition, the gel fraction of the rubber particles is preferably 5% or more. A case in which the gel fraction is less than 5% is not preferred because the heat resistance tends to be reduced as well as the impact resistance. The gel fraction may be determined from the following equation by immersing a predetermined amount of dry rubber particles ($W1$ (g)) in a sufficient amount of THF, leaving the mixture to stand at room temperature for 7 days, then separating a solid content from the mixture through centrifugation or the like, and drying the solid content at 100° C. for 2 hours (solid content after drying: ($W2$ (g))).

Gel fraction (%)=$W2/W1$×100

The content of the rubber particles in the curable resin composition according to this embodiment is preferably 2 parts by mass or more and 65 parts by mass or less with respect to 100 parts by mass in total of the polyfunctional urethane (meth)acrylate, the monofunctional radically polymerizable compound, and the polyfunctional radically polymerizable compound. The content is more preferably 5 parts by mass or more and 60 parts by mass or less. When the content of the rubber particles falls within the above-mentioned ranges, a cured product achieving both of high impact resistance and high heat resistance can be obtained. When the content of the rubber particles is less than 2 parts by mass, there is a tendency that the impact resistance-improving effect of the addition of the rubber particles is hardly obtained. In addition, a case in which the content of the rubber particles is more than 65 parts by mass is not preferred because the heat resistance of the cured product to be obtained is markedly reduced, and because there is a tendency that the viscosity of the curable resin composition is increased, making its handling difficult.

<Radical Polymerization Initiator>

As a radical polymerization initiator, a photoradical polymerization initiator or a thermal radical polymerization initiator may be used.

Photoradical polymerization initiators are mainly classified into an intramolecular cleavage type and a hydrogen abstraction type. When the intramolecular cleavage-type photoradical polymerization initiator absorbs light having a specific wavelength, a bond at a specific site is cleaved, and a radical is generated at the cleaved site to serve as a polymerization initiator to initiate the polymerization of an ethylenically unsaturated compound containing a (meth) acryloyl group. Meanwhile, the hydrogen abstraction type absorbs light having a specific wavelength to be brought into an excited state, and the resultant excited species causes a hydrogen abstraction reaction from a hydrogen donor present in the surroundings to generate a radical, which serves as a polymerization initiator to initiate the polymerization of a radically polymerizable compound.

As the intramolecular cleavage-type photoradical polymerization initiator, there are known an alkylphenone-based photoradical polymerization initiator, an acylphosphine oxide-based photoradical polymerization initiator, and an oxime ester-based photoradical polymerization initiator. Each of those initiators is of a type that generates a radical species through the α-cleavage of a bond adjacent to a carbonyl group. Examples of the alkylphenone-based photoradical polymerization initiator include a benzyl methyl ketal-based photoradical polymerization initiator, an α-hydroxyalkylphenone-based photoradical polymerization initiator, and an aminoalkylphenone-based photoradical polymerization initiator. Specific examples of the compound include, but not limited to: 2,2'-dimethoxy-1,2-diphenylethan-1-one (Irgacure (trademark) 651, manufactured by BASF) as the benzylmethyl ketal-based photoradical polymerization initiator; 2-hydroxy-2-methyl-1-phenylpropan-1-on e (Darocure 1173, manufactured by BASF), 1-hydroxycyclohexyl phenyl ketone (Irgacure 184, manufactured by BASF), 1-[4-(2-hydroxyethoxy)phenyl]-2-hydroxy-2-methyl-1-propan-1-one (Irgacure 2959, manufactured by BASF), or 2-hydroxy-1-{4-[4-(2-hydroxy-2-methylpropionyl)benzyl]phenyl}-2-methylpropan-1-one (Irgacure 127, manufactured by BASF) as the α-hydroxyalkylphenone-based photoradical polymerization initiator; and 2-methyl-1-(4-methylthiophenyl)-2-morpholinopropan-1-one (Irgacure 907, manufactured by BASF) or 2-benzylmethyl-2-dimethylamino-1-(4-morpholino phenyl)-1-butanone (Irgacure 369, manufactured by BASF) as the aminoalkylphenone-based photoradical polymerization initiator. Examples of the acylphosphine oxide-based photoradical polymerization initiator include, but not limited to, 2,4,6-trimethylbenzoyldiphenylphosphine oxide (Lucirin TPO, manufactured by BASF) and bis(2,4,6-trimethylbenzoyl)-phenylphosphine oxide (Irgacure 819, manufactured by BASF). An example of the oxime ester-based photoradical polymerization initiator is, but not limited to, (2E)-2-(benzoyloxyimino)-1-[4-(phenylthio)phenyl]octan-1-one (Irgacure OXE-01, manufactured by BASF). Examples of product names are shown together in the parentheses.

Examples of the hydrogen abstraction-type radical polymerization initiator include, but not limited to: anthraquinone derivatives, such as 2-ethyl-9,10-anthraquinone and 2-t-butyl-9,10-anthraquinone; and thioxanthone derivatives, such as isopropylthioxanthone and 2,4-diethylthioxanthone. Those photoradical polymerization initiators may be used alone or in combination thereof. In addition, the photoradical polymerization initiators may also be used in combination with the following heat radical polymerization initiator.

The addition amount of the photoradical polymerization initiator is preferably 0.1 part by mass or more and 15 parts by mass or less with respect to 100 parts by mass in total of the polyfunctional urethane (meth)acrylate, the monofunctional radically polymerizable compound, and the polyfunctional radically polymerizable compound. The addition amount is more preferably 0.1 part by mass or more and 10 parts by mass or less. When the amount of the photoradical polymerization initiator is small, there is a tendency that the polymerization becomes insufficient. When the polymerization initiator is added excessively, there is a risk in that the molecular weight is not increased, with the result that the heat resistance or the impact resistance is reduced.

In addition, any hitherto known compound that generates a radical through heating may be used as the thermal radical polymerization initiator without any particular limitation, and preferred examples thereof may include an azo-based compound, a peroxide, and a persulfuric acid salt. Examples of the azo-based compound include 2,2'-azobisisobutyronitrile, 2,2'-azobis(methyl isobutyrate), 2,2'-azobis-2,4-dimethylvaleronitrile, and 1,1'-azobis(1-acetoxy-1-phenylethane). Examples of the peroxide include benzoyl peroxide, di-t-butylbenzoyl peroxide, t-butyl peroxypivalate and di(4-t-butylcyclohexyl) peroxydicarbonate. Examples of the persulfuric acid salt include persulfuric acid salts such as ammonium persulfate, sodium persulfate, and potassium persulfate.

The addition amount of the thermal radical polymerization initiator is preferably 0.1 part by mass or more and 15 parts by mass or less, more preferably 0.1 part by mass or more and 10 parts by mass or less with respect to 100 parts by mass in total of the polyfunctional urethane (meth) acrylate, the monofunctional radically polymerizable compound, and the polyfunctional radically polymerizable compound. When the polymerization initiator is added excessively, there is a risk in that the molecular weight is not increased, with the result that the heat resistance or the impact resistance is reduced.

<Other Components (Additives)>

The curable resin composition according to this embodiment may contain various additives as other optional components, as long as the object and effects of the present invention are not impaired. The addition amount of the additive is preferably 0.05 part by mass or more and 25 parts by mass or less with respect to 100 parts by mass in total of the polyfunctional urethane (meth)acrylate, the monofunctional radically polymerizable compound, and the polyfunctional radically polymerizable compound. The addition amount is more preferably 0.1 part by mass or more and 20 parts by mass or less. As a physical property modifier for imparting a desired physical property to a cured product, any of the following components may be added, for example: resins, such as an epoxy resin, polyurethane, polychloroprene, polyester, polysiloxane, a petroleum resin, a xylene resin, a ketone resin, and a cellulose resin; engineering plastics, such as polycarbonate, modified polyphenylene ether, polyamide, polyacetal, polyethylene terephthalate, polybutylene terephthalate, ultra-high molecular weight polyethylene, polyphenylsulfone, polysulfone, polyarylate, polyether imide, polyether ether ketone, polyphenylene sulfide, polyethersulfone, polyamide imide, a liquid crystal polymer, polytetrafluoroethylene, polychlorotrifluoroethylene, and polyvinylidene fluoride; a fluorine-based oligomer, a silicone-based oligomer, and a polysulfide-based oligomer; soft metals, such as gold, silver, and lead; and layered crystal structure substances, such as graphite, molybdenum disulfide, tungsten disulfide, boron nitride, graphite fluoride, calcium fluoride, barium fluoride, lithium fluoride, silicon nitride, molybdenum selenide.

In addition, a polymerization inhibitor, such as phenothiazine or 2,6-di-t-butyl-4-methylphenol, a benzoin compound, an acetophenone compound, an anthraquinone compound, a thioxanthone compound, a ketal compound, a benzophenone compound, a tertiary amine compound, or a xanthone compound may be added as a photosensitizer.

Examples of the other additive may include a polymerization initiation aid, a levelling agent, a wettability improving agent, a surfactant, a plasticizer, a UV absorbing agent, a silane coupling agent, an inorganic filler, a pigment, a dye, an antioxidant, a flame retardant, a thickening agent, and an antifoaming agent.

<Curable Resin Composition>

The curable resin composition according to this embodiment may be produced as described below. Appropriate amounts of the polyfunctional urethane (meth)acrylate, the monofunctional radically polymerizable compound, the rubber particles, and the radical polymerization initiator, and, as required, the polyfunctional radically polymerizable compound and other optional components are loaded into a stirring container and stirred. A stirring temperature is generally 20° C. or more and 120° C. or less, preferably 40° C. or more and 100° C. or less. Then, a volatile solvent or the like is removed as required.

The curable resin composition according to this embodiment may be suitably used as a shaping material to be used for an optical shaping method. That is, a shaped object of a desired shape may be produced by selectively irradiating the curable resin composition according to this embodiment with an active energy ray, such as an ultraviolet/visible ray, an electron beam, an X-ray, or a radiation, to supply energy required for curing. When the curable resin composition according to this embodiment is used as a shaping material for an optical shaping method, its viscosity at 25° C. is preferably 50 mPa·s or more and 10,000 mPa·s or less, more preferably 50 mPa·s or more and 5,000 mPa·s or less.

<Cured Product>

A resin cured product according to this embodiment may be obtained by curing the above-mentioned curable resin composition through use of a known method, such as active energy ray irradiation or the application of heat. Examples of the active energy ray may include an ultraviolet/visible ray, an electron beam, an X-ray, and a radiation. Of those, an ultraviolet/visible ray having a wavelength of 300 nm or more and 450 nm or less may be preferably used because of ease of availability and compatibility with the photoradical polymerization initiator. An ultraviolet/visible ray laser (e.g., an Ar laser or a He—Cd laser), a mercury lamp, a xenon lamp, a halogen lamp, a fluorescent lamp, or the like may be used as a light source of the ultraviolet/visible ray. Of those, a laser light source is preferably adopted because an energy level can be increased to shorten a shaping time, and besides, a light condensing property is excellent and high shaping accuracy can be obtained. The curing method may be appropriately selected in accordance with the kind of the radical polymerization initiator contained in the curable resin composition. In addition, the curing methods may be used alone or in combination thereof.

The cured product according to this embodiment preferably has a so-called sea-island structure, which is a phase-separated structure in which, as illustrated in FIG. 1, island phases or continuous phases (hereinafter referred to as island phases/continuous phases) 11 containing the rubber particles as a main component are dispersed in a sea phase 10 containing as a main component a polymer of the polyfunctional urethane (meth)acrylate and the monofunctional radically polymerizable compound, or a polymer of the polyfunctional urethane (meth)acrylate, the monofunctional radically polymerizable compound, and the polyfunctional radically polymerizable compound.

Further, the cured product preferably has a phase-separated structure in which at least one selected from the group consisting of a polymer of the polyfunctional urethane (meth)acrylate and the monofunctional radically polymerizable compound, and a polymer of the polyfunctional urethane (meth)acrylate, the monofunctional radically polymerizable compound, and the polyfunctional radically polymerizable compound, is separated from the rubber particles in the island phases/continuous phases 11. The following sea-island structure is more preferred: as illustrated in FIG. 1, island phases/continuous phases 12 each formed of at least one selected from the group consisting of a polymer of the polyfunctional urethane (meth)acrylate and the monofunctional radically polymerizable compound, and a polymer of the polyfunctional urethane (meth)acrylate, the monofunctional radically polymerizable compound, and the polyfunctional radically polymerizable compound are scattered at a plurality of sites in each of the island phases/continuous phases 11 formed of the rubber particles.

In a cross-section of the cured product, the average value of diameters or tube diameters in the case where the island phases/continuous phases 12 are island phases or continuous phases, respectively, is preferably 0.5 nm or more and 200 nm or less. The average value is more preferably 1 nm or more and 150 nm or less. When the average value falls within the above-mentioned ranges, high impact resistance and high heat resistance can both be achieved. When the island phases/continuous phases 12 observed through cross-sectional observation of the cured product are not perfect circles, the average value of the diameters of a plurality of island phases included in the observation area or the average value of the tube diameters of the continuous phases 12 included therein may be determined by using a minor axis serving as the shortest diameter as an indicator.

The phase-separated structure that the sea phase and the island phases/continuous phases have, such as a sea-island structure, a salami structure, or a co-continuous structure, may be recognized by observing composition distribution, shape, or viscoelasticity through use of a scanning electron microscope (SEM), a transmission electron microscope (TEM), an atomic force microscope (AFM), or the like. Alternatively, the phase-separated structure may be recognized by measuring composition distribution through use of a Nano-IR measurement apparatus.

<Production Method for Three-Dimensional Shaped Object>

The curable resin composition according to this embodiment may be suitably used as a shaping material for an optical shaping method. A three-dimensional shaped object obtained by curing the curable resin composition according to this embodiment may be produced using a known optical shaping method and apparatus. A preferred typical example of the optical shaping method is a method including a step of shaping a shaped object by photocuring layers of the curable resin composition one by one based on slice data generated from three-dimensional shape data on a three-dimensional model. A specific example of the method may be as described below. The curable resin composition in a liquid state is selectively irradiated with the above-mentioned active energy ray based on the slice data so as to provide a cured layer having a desired pattern, to thereby form the cured layer. Then, an uncured layer formed of the curable resin composition in a liquid state is supplied to be brought into contact with the above-mentioned cured layer, and is similarly irradiated with the active energy ray based on the slice data to newly form a cured layer continuous with the above-mentioned cured layer. This stacking process is repeated to finally provide a three-dimensional shaped object of interest corresponding to the three-dimensional model.

In the formation of each cured resin layer having a desired shape pattern by irradiating the uncured layer formed of the curable resin composition with the active energy ray, an active energy ray condensed into a dot shape, such as laser light, may be radiated in a dot-drawing mode or a line-drawing mode. In addition, the following mode may be adopted: irradiating the uncured layer with the active energy ray in a planar shape through a planar drawing mask formed by arranging a plurality of micro-optical shutters, such as liquid crystal shutters or digital micro-mirror shutters.

A typical example of the optical shaping method is as described below. First, a supporting stage arranged to be vertically movable in a container accommodating the curable resin composition in a liquid state is lowered (settled) only in a predetermined quantity based on slice data from a liquid surface of the resin composition, to thereby form a thin layer (1) of the curable resin composition on the supporting stage. Then, the thin layer (1) is selectively irradiated with light to form a cured layer (1) which has been cured into a solid state. Then, the curable resin composition is supplied onto the cured layer (1) to newly form a thin layer (2), and the thin layer (2) is selectively irradiated with light, to thereby form a new cured layer (2) on the cured layer (1) in such a manner as to be continuous thereto and integrally stacked thereon. Then, while the pattern to be irradiated with light is changed or unchanged based on the slice data, this process is repeated a predetermined number of times, to thereby shape a shaped object in which a plurality of cured layers (1, 2, . . . n) are integrally stacked.

The shaped object thus obtained is taken out of the container, followed by cleaning or the like as required to remove an unreacted curable resin composition remaining on its surface. As a cleaning agent, there may be used, for example: alcohol-based organic solvents typified by alcohols, such as isopropyl alcohol and ethyl alcohol; ketone-based organic solvents typified by acetone, ethyl acetate, and methyl ethyl ketone; and aliphatic organic solvents typified by terpenes. After removing an unreacted curable resin composition, post-curing may be performed by an active energy ray or heat as required. The post-curing can cure the unreacted curable resin composition remaining on the surface and inside of the shaped object, and hence can suppress stickiness of the surface of the shaped object, and besides, can enhance the initial strength of the shaped object.

EXAMPLES

This embodiment is described in detail below by way of Examples, but this embodiment is not limited to these Examples.
<Materials>
Materials used in Examples and Comparative Examples are listed below.
[Polyfunctional Urethane (Meth)acrylate]
  A-1: difunctional urethane acrylate; "KAYARAD UX-6101" (manufactured by Nippon Kayaku Co., Ltd., weight-average molecular weight (actually measured value): $6.7 \times 10^3$)
  A-2: difunctional urethane acrylate; "KAYARAD UX-8101" (manufactured by Nippon Kayaku Co., Ltd., weight-average molecular weight (actually measured value): $3.3 \times 10^3$)
  A-3: difunctional urethane acrylate; "UA-122P" (manufactured by Shin-nakamura Chemical Co., Ltd., weight-average molecular weight (actually measured value): $2.3 \times 10^3$)
  A-4: difunctional urethane acrylate; "KUA-PC2I" (manufactured by KSM Co., Ltd., weight-average molecular weight (actually measured value): $2.3 \times 10^4$)
  A-5: urethane (meth)acrylate produced by a method described below (weight-average molecular weight (actually measured value): $7.1 \times 10^3$)

(Production of A-5)
100 Parts by mass of a polycarbonate diol (T6002: manufactured by Asahi Kasei Corporation, hydroxy group value: 57.6 mgKOH/g) and 15 parts by mass of 2-isocyanatoethyl acrylate (AOI-VM: manufactured by Showa Denko K.K.) were loaded in a glass container. 0.020 Part by mass of dibutyltin dilaurate was added as a catalyst, and the compounds were reacted each other by stirring at 60° C. for 2 hours. After that, the resultant was cooled to normal temperature to obtain a white solid as a reaction product.
[Monofunctional Radically Polymerizable Compound]
  B-1: acryloylmorpholine; "ACMO" (manufactured by KJ Chemicals Corporation)
  B-2: N-isopropylacrylamide; "NIPAM" (manufactured by KJ Chemicals Corporation)
  B-3: isobornyl methacrylate
  B-4: acryloylpiperidine
  B-5: N-phenylmethacrylamide
  B-6: N-phenylacrylamide
  B-7: N-tert-butylmethacrylamide
  B-8: N-tert-butylacrylamide
  B-9: N,N-diethylacrylamide; "DEAA" (manufactured by KJ Chemicals Corporation)
  B-10: N-phenylmaleimide; "imilex-P" (manufactured by Nippon Shokubai Co., Ltd.)
  B-11: N-cyclohexylmaleimide; "imilex-C" (manufactured by Nippon Shokubai Co., Ltd.)
  B-12: 2-hydroxyethyl methacrylate
  B-13: methyl methacrylate
  B-14: dicyclopentenyl acrylate
  B-15: 1H,1H,5H-octafluoropentyl methacrylate
  B-16: styrene
  B-17: glycidyl methacrylate
  B-18: (3-ethyl oxetan-3-yl)methyl methacrylate
  B-19: methyl α-allyloxymethyl acrylate
  B-20: 3-hydroxy-1-adamantyl methacrylate
[Polyfunctional Radically Polymerizable Compound Having Radically Polymerizable Functional Group Equivalent of Less Than 300 g/eq]
  C-1: diacrylic acid ester of a caprolactone 2 mol adduct of neopentyl glycol hydroxypivalate; "KAYARAD HX-220" (molecular weight: 540.65, radically polymerizable functional group equivalent: 270 g/eq, manufactured by Nippon Kayaku Co., Ltd.)
  C-2: urethane dimethacrylate (molecular weight: 470.56, radically polymerizable functional group equivalent: 235 g/eq, manufactured by Sigma-Aldrich Co., LLC.)
  C-3: ethoxylated isocyanurate triacrylate; "A-9300" (molecular weight: 423, radically polymerizable functional group equivalent: 141 g/eq, manufactured by Shin-nakamura Chemical Co., Ltd.)
[Polyfunctional Radically Polymerizable Compound Having Radically Polymerizable Functional Group Equivalent of 300 g/eq or More]
  C-4: polycarbonate diol diacrylate "UM-90 (⅓) DM" (molecular weight: about 900, radically polymerizable functional group equivalent: about 450 g/eq, manufactured by Ube Industries, Ltd.)
[Radical Polymerization Initiator]
  E-1: photoradical generator; "Irgacure 819" (manufactured by BASF)
[Rubber Particles]
The rubber particles were produced in Production Examples shown below.

(Production Example 1 of Rubber Particles)

A glass container was loaded with 185 parts by mass of a polybutadiene latex (Nipol LX111A2: manufactured by Zeon Corporation) (corresponding to 100 parts by mass of polybutadiene rubber particles) and 315 parts by mass of deionized water, and while nitrogen purging was performed, the contents were stirred at 60° C. 0.005 Part by mass of disodium ethylenediaminetetraacetate (EDTA), 0.001 part by mass of ferrous sulfate heptahydrate, and 0.2 part by mass of sodium formaldehyde sulfoxylate were added, and then a mixture of 35 parts by mass of radically polymerizable compounds for forming a shell layer (17.5 parts by mass of methyl methacrylate; MMA and 17.5 parts by mass of 3-methyl-3-oxetanyl-methyl methacrylate; OXMA: manufactured by Ube Industries, Ltd.) and 0.1 part by mass of cumene hydroperoxide was continuously added over 2 hours, to thereby graft-polymerize the radically polymerizable compounds onto the surfaces of the polybutadiene rubber particles. After the completion of the addition, the mixture was further stirred for 2 hours to complete the reaction. Thus, an aqueous dispersion of rubber particles each having a core-shell structure including polybutadiene rubber as a core and a polymer of the radically polymerizable compounds as a shell layer was obtained.

The aqueous dispersion of rubber particles each having a core-shell structure obtained as described above was charged into 450 parts by mass of acetone, and the whole was uniformly mixed. The mixture was centrifuged with a centrifuge at a number of revolutions of 12,000 rpm and a temperature of 10° C. for 30 minutes, and then the supernatant was removed. Settled rubber particles each having a core-shell structure were redispersed by adding acetone thereto, and centrifugation and supernatant removal were repeated twice under the same conditions as above. Thus, an acetone dispersion of rubber particles (D-1) was obtained. The rubber particles (D-1) had an average particle diameter of 0.32 μm.

(Production Example 2 of Rubber Particles)

An acetone dispersion of rubber particles (D-2) each having a core-shell structure was obtained in the same manner as in Production Example 1 of rubber particles except that the composition of the radically polymerizable compounds for forming a shell layer was changed to 35 parts by mass of MMA. The rubber particles (D-2) had an average particle diameter of 0.30 μm.

<Production of Curable Resin Composition>

The polyfunctional urethane (meth)acrylate, the monofunctional radically polymerizable compound, and the radical polymerization initiator, or the polyfunctional urethane (meth)acrylate, the monofunctional radically polymerizable compound, the polyfunctional radically polymerizable compound having a radically polymerizable functional group equivalent of less than 300 g/eq, and the radical polymerization initiator were blended at a blending ratio shown in Table 1, and were uniformly mixed. The acetone dispersion of rubber particles was mixed into the blend, and a volatile component, i.e., acetone was removed using a rotary evaporator to provide a curable resin composition.

<Production of Test Piece>

A cured product was produced from the prepared curable resin composition by the following method. First, a mold having a length of 80 mm, a width of 10 mm, and a thickness of 4 mm was sandwiched between two sheets of quartz glass, and the curable resin composition was poured thereinto. The poured curable resin composition was irradiated with 5 mW/cm$^2$ of an ultraviolet ray from both surfaces of the mold alternately 4 times for 180 seconds each, through use of an ultraviolet irradiator (manufactured by HOYA CANDEO OPTRONICS CORPORATION, product name: "LIGHT SOURCE EXECURE 3000"). The resultant cured product was thermally treated in a heating oven at 50° C. for 1 hour and in a heating oven at 100° C. for 2 hours. Thus, a test piece having a length of 80 mm, a width of 10 mm, and a thickness of 4 mm was obtained.

<Evaluation>

[Measurement of Weight-average Molecular Weight of Polyfunctional Urethane (Meth)acrylate]

Two Shodex GPC LF-804 columns (manufactured by Showa Denko K.K., exclusion limit molecular weight: $2\times10^6$, separation range: 300 to $2\times10^6$) were arranged in series in a gel permeation chromatography (GPC) apparatus (manufactured by Tosoh Corporation, HLC-8220GPC), and the weight-average molecular weight of each of the polyfunctional urethane (meth)acrylates A-1 to A-5 was measured with a differential refractive index (RI) detector at 40° C. through use of THF as a developing solvent. The weight-average molecular weight thus obtained is a value in terms of standard polystyrene.

[Average Particle Diameter of Rubber Particles]

With use of a particle size analyzer (manufactured by Malvern, Zetasizer Nano ZS), about 1 ml of a dilute acetone dispersion of the rubber particles (D-1) was placed in a glass cell and subjected to measurement at 25° C. A Z-average size obtained as a result was adopted as the average particle diameter of the rubber particles (D-1). The average particle diameter of the rubber particles (D-2) was similarly determined.

[Deflection Temperature Under Load]

A test piece was increased in temperature from room temperature at 2° C. per minute in conformity with JIS K 7191-2 with a deflection-temperature-under-load tester (manufactured by Toyo Seiki Seisaku-sho, Ltd., product name: "No. 533 HDT TESTER 3M-2") at a bending stress of 1.80 MPa. A temperature at which the deflection amount of the test piece reached 0.34 mm was adopted as a deflection temperature under load and used as an indicator of heat resistance. The results thus obtained are shown in Table 1. For the evaluation of the heat resistance, a case in which the deflection temperature under load was 80° C. or more was graded A (extremely satisfactory), a case in which the deflection temperature under load was 60° C. or more and less than 80° C. was graded B (satisfactory), and a case in which the deflection temperature under load was less than 60° C. was graded C (unsatisfactory).

[Charpy Impact Strength]

In conformity with JIS K 7111, a 45° cutout (notch) having a depth of 2 mm was formed at the center of the test piece with a cutout-forming machine (manufactured by Toyo Seiki Seisaku-sho, Ltd., product name: "NOTCHING TOOL A-4"). The test piece was fractured from its surface opposite to the cutout with an energy of 2 J through use of an impact tester (manufactured by Toyo Seiki Seisaku-sho, Ltd., product name: "IMPACT TESTER IT"). The energy required for the fracture was calculated from the angle to which a hammer, which had been raised to 150°, swung up after the fracture of the test piece, and was adopted as Charpy impact strength and used as an indicator of impact resistance. The results thus obtained are shown in Table 1. For the evaluation of the impact resistance, a case in which the Charpy impact strength was 12 kJ/m$^2$ or more was graded A (extremely satisfactory), a case in which the Charpy impact strength was 8 kJ/m$^2$ or more and less than 12 kJ/m$^2$ was graded B (satisfactory), and a case in which the Charpy impact strength was less than 8 kJ/m$^2$ was graded C (unsatisfactory).

TABLE 1

|  |  | Example | | | | | | | | | | Comparative Example | | | |
|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 |
| Polyfunctional urethane (meth)acrylate (parts by mass) | A-1 | 30 | 30 | 30 | 20 | 20 | 20 |  |  | 20 | 20 | 20 | 20 | 20 |  |
|  | A-2 |  |  |  |  |  |  | 20 |  |  |  |  |  |  |  |
|  | A-3 |  |  |  |  |  |  |  | 20 |  |  |  |  |  |  |
| Monofunctional radically polymerizable compound (parts by mass) | B-1 | 70 | 70 | 70 | 80 | 70 | 66 | 80 | 80 | 60 | 60 | 63 | 60 | 55 | 70 |
|  | B-2 |  |  |  |  |  |  |  |  | 20 |  |  |  |  |  |
|  | B-3 |  |  |  |  |  |  |  |  |  | 20 |  |  |  |  |
| Polyfunctional radically polymerizable compound (parts by mass) | C-1 |  |  |  | 10 | 14 |  |  |  |  |  | 17 | 20 | 25 |  |
|  | C-2 |  |  |  |  |  |  |  |  |  |  |  |  |  | 30 |
| Content of polyfunctional radically polymerizable compound having radically polymerizable functional group equivalent of less than 300 g/eq |  | 0 | 0 | 0 | 0 | 12 | 18 | 0 | 0 | 0 | 0 | 21 | 25 | 31 | 30 |
| Rubber particles (parts by mass) | D-1 | 25 | 18 | 11 | 25 | 25 | 25 | 25 | 25 | 25 | 25 | 25 | 25 | 25 | 25 |
| Radical polymerization initiator (parts by mass) | E-1 | 2 | 2 | 2 | 2 | 2 | 2 | 2 | 2 | 2 | 2 | 2 | 2 | 2 | 2 |
| Deflection temperature under load (° C.) |  | 77 B | 74 B | 78 B | 85 A | 80 A | 77 B | 68 B | 81 A | 68 B | 90 A | 76 B | 72 B | 69 B | 95 A |
| Charpy impact strength (kJ/m$^2$) |  | 15.6 A | 14.1 A | 12.3 A | 13.8 A | 11.7 B | 11.5 B | 9.8 B | 8.2 B | 14.2 A | 9.5 B | 7.5 C | 6.6 C | 5.4 C | 5.6 C |

TABLE 2

|  |  | Example | | | | | | | |
|---|---|---|---|---|---|---|---|---|---|
|  |  | 11 | 12 | 13 | 14 | 15 | 16 | 17 | 18 |
| Polyfunctional urethane (meth)acrylate (parts by mass) | A-1 | 30 | 30 | 30 | 30 | 30 | 30 | 30 | 30 |
|  | A-2 |  |  |  |  |  |  |  |  |
|  | A-3 |  |  |  |  |  |  |  |  |
| Monofunctional radically polymerizable compound (parts by mass) | B-1 | 50 | 50 | 50 | 50 | 50 | 50 | 50 | 50 |
|  | B-4 | 20 |  |  |  |  |  |  |  |
|  | B-5 |  | 20 |  |  |  |  |  |  |
|  | B-6 |  |  | 20 |  |  |  |  |  |
|  | B-7 |  |  |  | 20 |  |  |  |  |
|  | B-8 |  |  |  |  | 20 |  |  |  |
|  | B-9 |  |  |  |  |  | 20 |  |  |
|  | B-10 |  |  |  |  |  |  | 20 |  |
|  | B-11 |  |  |  |  |  |  |  | 20 |
| Polyfunctional radically polymerizable compound (parts by mass) | C-1 |  |  |  |  |  |  |  |  |
|  | C-2 |  |  |  |  |  |  |  |  |
| Content of polyfunctional radically polymerizable compound having radically polymerizable functional group equivalent of less than 300 g/eq |  | 0 | 0 | 0 | 0 | 0 | 0 | 0 | 0 |
| Rubber particles (parts by mass) | D-1 | 25 | 25 | 25 | 25 | 25 | 25 | 25 | 25 |
| Radical polymerization initiator (parts by mass) | E-1 | 2 | 2 | 2 | 2 | 2 | 2 | 2 | 2 |
| Deflection temperature under load (° C.) |  | 75 B | 82 A | 86 A | 78 B | 77 B | 74 B | 80 A | 80 A |
| Charpy impact strength (kJ/m$^2$) |  | 14.2 A | 9.4 B | 8.0 B | 9.7 B | 8.0 B | 14.4 A | 8.7 B | 8.1 B |

TABLE 3

|  |  | Example | | | | | | | | | | | | | |
|---|---|---|---|---|---|---|---|---|---|---|---|---|---|---|---|
|  |  | 19 | 20 | 21 | 22 | 23 | 24 | 25 | 26 | 27 | 28 | 29 | 30 | 31 | 32 |
| Polyfunctional urethane (meth)acrylate (parts by mass) | A-1 | 20 | 20 | 20 | 20 | 20 | 20 | 20 | 20 | 20 |  | 20 |  | 30 | 20 |
|  | A-2 |  |  |  |  |  |  |  |  |  |  |  |  | 10 |  |
|  | A-3 |  |  |  |  |  |  |  |  |  |  |  |  |  |  |
|  | A-4 |  |  |  |  |  |  |  |  |  | 20 |  |  |  |  |
|  | A-5 |  |  |  |  |  |  |  |  |  |  |  | 20 |  |  |

TABLE 3-continued

| | | \multicolumn{14}{c}{Example} |
| | | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| Monofunctional radically Polymerizable compound (parts by mass) | B-1 | 60 | 60 | 60 | 60 | 60 | 60 | 60 | 60 | 60 | 80 | 60 | 80 | 50 | 80 |
| | B-12 | 20 | | | | | | | | | | | | | |
| | B-13 | | 20 | | | | | | | | | | | | |
| | B-14 | | | 20 | | | | | | | | | | | |
| | B-15 | | | | 20 | | | | | | | | | | |
| | B-16 | | | | | 20 | | | | | | | | | |
| | B-17 | | | | | | 20 | | | | | | | | |
| | B-18 | | | | | | | 20 | | | | | | | |
| | B-19 | | | | | | | | 20 | | | | | | |
| | B-20 | | | | | | | | | 20 | | | | | |
| Polyfunctional radically polymerizable compound (parts by mass) | C-3 | | | | | | | | | | | | | 10 | |
| | C-4 | | | | | | | | | | | 20 | | | |
| Content of polyfunctional radically polymerizable compound having radically polymerizable functional group equivalent of less than 300 g/eq | | 0 | 0 | 0 | 0 | 0 | 0 | 0 | 0 | 0 | 0 | 0 | 0 | 17 | 0 |
| Rubber particles (parts by mass) | D-1 | 25 | 25 | 25 | 25 | 25 | 25 | 25 | 25 | 25 | 25 | 25 | 25 | 25 | |
| | D-2 | | | | | | | | | | | | | | 25 |
| Radical polymerization initiator (parts by mass) | E-1 | 2 | 2 | 2 | 2 | 2 | 2 | 2 | 2 | 2 | 2 | 2 | 2 | 2 | 2 |
| Deflection temperature under load (° C.) | | 60 B | 63 B | 72 B | 66 B | 68 B | 62 B | 67 B | 70 B | 88 A | 63 B | 64 B | 65 B | 86 A | 78 B |
| Charpy impact strength (kJ/m$^2$) | | 9.9 B | 14.2 A | 10.7 B | 12.6 A | 13.9 A | 12.9 A | 13.6 A | 17.1 A | 11.8 B | 20.5 A | 11.6 B | 14.3 A | 11.6 B | 13.8 A |

In Tables 1 to 3, a blank means that the corresponding material is not contained in the composition. In addition, in Tables 1 to 3, the content of the polyfunctional radically polymerizable compound having a radically polymerizable functional group equivalent of less than 300 g/eq means the content of the polyfunctional radically polymerizable compound having a radically polymerizable functional group equivalent of less than 300 g/eq with respect to 100 parts by mass in total of the monofunctional radically polymerizable compound and the polyfunctional radically polymerizable compound.

Figure 2:
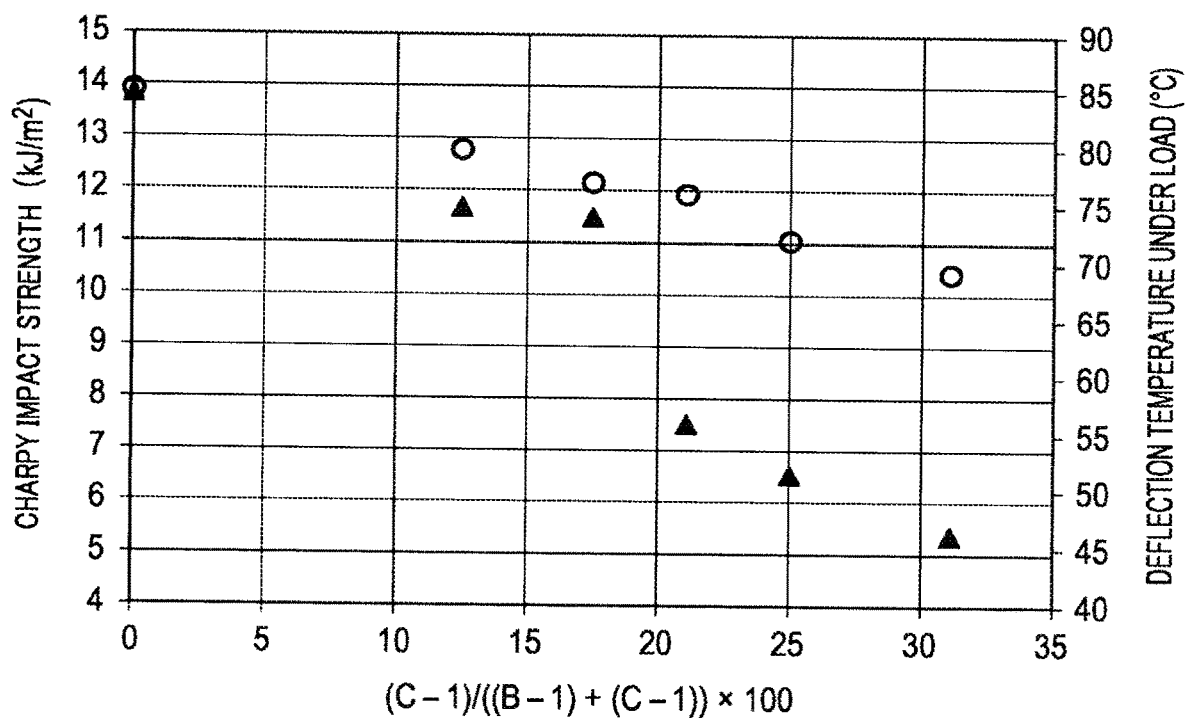
FIG. 2 is a graph showing a relationship between the ratio of a polyfunctional radically polymerizable compound having a radically polymerizable functional group equivalent of less than 300 g/eq with respect to the total of a monofunctional radically polymerizable compound and the polyfunctional radically polymerizable compound, and each of the Charpy impact strength and deflection temperature under load of the cured product of the curable resin composition.

Based on the results shown in Table 1, a relationship between the content of the polyfunctional radically polymerizable compound (C-1) having a radically polymerizable functional group equivalent of less than 300 g/eq with respect to 100 parts by mass in total of the monofunctional radically polymerizable compound (B-1) and the polyfunctional radically polymerizable compound (C-1), and each of the Charpy impact strength ("▲" plot) and the deflection temperature under load ("○" plot) is shown in FIG. 2 (Examples 4 to 6, and Comparative Examples 1 to 3). As shown in FIG. 2, the cured products each obtained from the curable resin composition according to this embodiment (Examples 4 to 6) are excellent in both of impact resistance and heat resistance, thus being suitable for achieving the effect of the present invention, as compared to the cured products each obtained from a composition containing the polyfunctional radically polymerizable compound having a radically polymerizable functional group equivalent of less than 300 g/eq in excess of the scope of the present invention (Comparative Examples 1 to 3). Specifically, the following tendency was observed: the deflection temperature under load was reduced linearly and gently with respect to an increase in content of the polyfunctional radically polymerizable compound having a radically polymerizable functional group equivalent of less than 300 g/eq with respect to 100 parts by mass in total of the monofunctional radically polymerizable compound, the polyfunctional radically polymerizable compound having a radically polymerizable functional group equivalent of less than 300 g/eq, and the polyfunctional radically polymerizable compound having a radically polymerizable functional group equivalent of 300 g/eq or more. Meanwhile, the Charpy impact strength was highest when the content of the polyfunctional radically polymerizable compound having a radically polymerizable functional group equivalent of less than 300 g/eq with respect to 100 parts by mass in total of the monofunctional radically polymerizable compound, the polyfunctional radically polymerizable compound having a radically polymerizable functional group equivalent of less than 300 g/eq, and the polyfunctional radically polymerizable compound having a radically polymerizable functional group equivalent of 300 g/eq or more was 0 parts by mass, and the following tendency was observed: the Charpy impact strength was gently reduced along with an increase in content of the polyfunctional radically polymerizable compound having a radically polymerizable functional group equivalent of less than 300 g/eq, and was sharply reduced after around 20 parts by mass. That is, with respect to 100 parts by mass in total of the monofunctional radically polymerizable compound and the polyfunctional radically polymerizable compound, it is found that the cured products each obtained from the curable resin composition according to this embodiment each have much more excellent Charpy impact strength while the cured products each obtained from a curable resin composition in which the content of the polyfunctional radically polymerizable compound having a radically polymerizable functional group equivalent of less than 300 g/eq with respect to 100 parts by mass in total of the monofunctional radically polymerizable compound and the polyfunctional radically polymerizable compound is 20 parts by mass or more each have Charpy impact strength equivalent to that of the related art. As a result, it was revealed that the curable resin composition according to this embodiment was able to achieve both of high impact resistance and high heat resistance.

Figure 3:
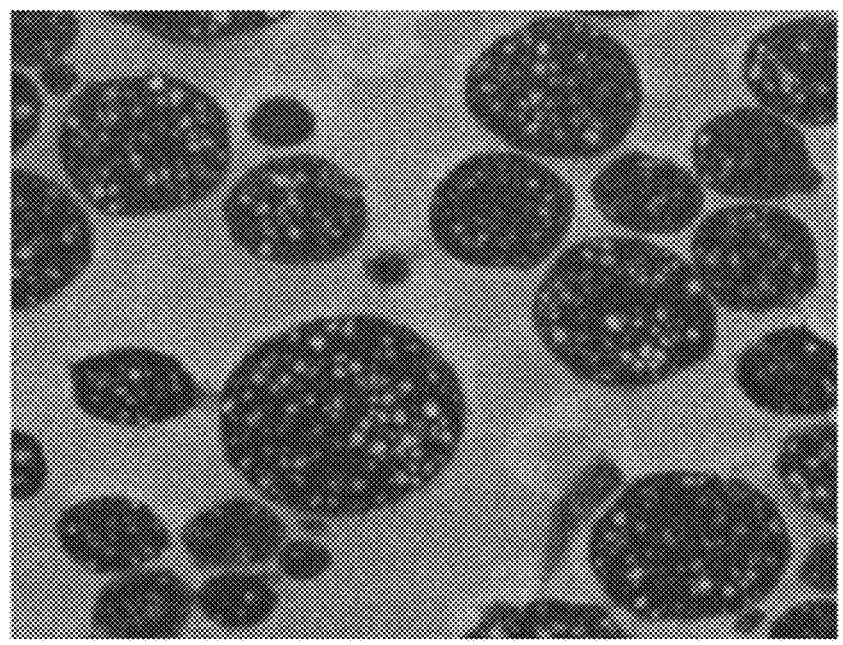
FIG. 3 is a photograph of a cross-section of a cured product of a curable resin composition of Example 1 taken with a scanning electron microscope.
Figure 3:

In addition, a backscattered electron image taken of an ultrathin section of the cured product of Example 1 via a scanning electron microscope (SEM) after the staining thereof with phosphotungstic acid is shown in FIG. 3. In FIG. 3, the polybutadiene rubber (rubber component), which is not stained with phosphotungstic acid, can be recognized as blackish island phases. In addition, it was able to be recognized through Nano-IR measurement that gray portions dispersed therein and a sea phase spreading outside each contained a polymer of at least a bifunctional urethane acrylate and acryloylmorpholine. Further, it was able to be recognized through use of an atomic force microscope (AFM) that the sea phase had formed a phase-separated structure in which a phase formed of a polymer using the polyfunctional urethane (meth)acrylate as a main component, and a phase formed of a polymer using the monofunctional radically polymerizable compound as a main component were microscopically separated.

The above-mentioned results have revealed that the curable resin composition according to this embodiment has the excellent effect of achieving both of high impact resistance and high heat resistance, and hence can be suitably used for optical three-dimensional shaping.

Thus, according to the present disclosure, the curable resin composition capable of forming a cured product excellent in impact resistance and heat resistance, thereby being suitable for three-dimensional shaping, can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A curable resin composition, comprising:
a polyfunctional urethane (meth)acrylate (A);
a monofunctional radically polymerizable compound (B) having one radically polymerizable functional group in a molecule;
rubber particles (C); and
a radical polymerization initiator (D),
wherein the monofunctional radically polymerizable compound (B) includes a monofunctional acrylamide-based compound, a monofunctional styrene-based compound, a monofunctional maleimide-based compound, a monofunctional vinyl ester-based compound, a monofunctional vinyl cyanide-based compound, or a monofunctional N-vinyl-based compound, and
wherein the curable resin composition does not contain a polyfunctional radically polymerizable compound (E) other than the polyfunctional urethane (meth)acrylate (A).

2. The curable resin composition according to claim 1, wherein a content of the polyfunctional urethane (meth) acrylate (A) is 5 parts by mass to 70 parts by mass with respect to 100 parts by mass of a total amount of the polyfunctional urethane (meth)acrylate (A) and the monofunctional radically polymerizable compound (B).

3. The curable resin composition according to claim 1, wherein a content of the polyfunctional urethane (meth) acrylate (A) is 10 parts by mass to 60 parts by mass or less with respect to 100 parts by mass of a total amount of the polyfunctional urethane (meth)acrylate (A) and the monofunctional radically polymerizable compound (B).

4. The curable resin composition according to claim 1, wherein a content of the polyfunctional urethane (meth) acrylate (A) is 20 parts by mass to 40 parts by mass with respect to 100 parts by mass of a total amount of the polyfunctional urethane (meth)acrylate (A) and the monofunctional radically polymerizable compound (B).

5. The curable resin composition according to claim 4, wherein a weight-average molecular weight of the polyfunctional urethane (meth)acrylate (A) is 1000 to 60000.

6. The curable resin composition according to claim 1, wherein the monofunctional radically polymerizable compound (B) includes a monofunctional acrylamide-based compound or a monofunctional (meth)acrylate-based compound.

7. The curable resin composition according to claim 5, wherein the monofunctional radically polymerizable compound (B) includes a monofunctional acrylamide-based compound.

8. The curable resin composition according to claim 1, wherein a content of the rubber particles (C) is 2 parts by mass to 65 parts by mass with respect to 100 parts by mass of a total of the polyfunctional urethane (meth)acrylate (A) and the monofunctional radically polymerizable compound (B).

9. The curable resin composition according to claim 1, wherein the rubber particles (C) are each formed of any one selected from the group consisting of a butadiene rubber, a crosslinked butadiene rubber, a styrene/butadiene copolymer rubber, an acrylic rubber, and a silicone/acrylic composite rubber.

10. The curable resin composition according to claim 1, wherein the rubber particles (C) each have a core-shell structure, and
wherein a core of each of the rubber particles (C) is formed of at least one selected from the group consisting of a butadiene rubber, a crosslinked butadiene rubber, a styrene/butadiene copolymer rubber, an acrylic rubber, and a silicone/acrylic composite rubber.

11. The curable resin composition according to claim 1, wherein the rubber particles (C) each have a core-shell structure, and
wherein the shell of each of the rubber particles (C) further contains a polymer of the polyfunctional urethane (meth)acrylate (A) or a polymer of a polyfunctional radically polymerizable compound.

12. The curable resin composition according to claim 1, wherein the polyfunctional urethane (meth)acrylate (A) is difunctional urethane acrylate.

13. A cured product made from the curable resin composition according to claim 1.

14. The cured product according to claim 13, wherein a deflection temperature under load of the cured product is 60° C. or more.

15. The cured product according to claim 13, wherein a Charpy impact strength of the cured product is 8 KJ/m2 or more.

16. A method for producing a cured product, comprising curing the curable resin composition of claim 1.

17. A method for producing a three-dimensional object, comprising repeating a step of supplying an uncured layer formed of the curable resin composition according to claim 1 and a step of irradiating the uncured layer with an active energy ray based on three-dimensional shape data on a three-dimensional model, to thereby obtain a shaped object formed of a cured product of the resin composition.

* * * * *